(12) United States Patent
Armstrong

(10) Patent No.: US 9,728,099 B2
(45) Date of Patent: Aug. 8, 2017

(54) MANIPULATIVE SYSTEM FOR TEACHING MUSICAL NOTATION

(76) Inventor: Robin Elizabeth Armstrong, Minnetrista, MN (US)

( * ) Notice: Subject to any disclaimer, the term of this patent is extended or adjusted under 35 U.S.C. 154(b) by 700 days.

(21) Appl. No.: 13/087,350

(22) Filed: Apr. 14, 2011

(65) Prior Publication Data

US 2011/0252946 A1    Oct. 20, 2011

Related U.S. Application Data

(60) Provisional application No. 61/324,049, filed on Apr. 14, 2010.

(51) Int. Cl.
  *G09B 15/02*    (2006.01)
(52) U.S. Cl.
  CPC .................. *G09B 15/023* (2013.01)
(58) Field of Classification Search
  CPC .................................................... G09B 15/023
  USPC ............. 84/470 R, 471 R, 476, 477 R, 483.2
  See application file for complete search history.

(56) References Cited

U.S. PATENT DOCUMENTS

| | | | | |
|---|---|---|---|---|
| 145,622 | A * | 12/1873 | Brown et al. | 84/471 R |
| 539,539 | A * | 5/1895 | Palmer et al. | 40/620 |
| 595,157 | A * | 12/1897 | Fletcher | 84/471 R |
| 636,232 | A * | 11/1899 | Anderson | 84/470 R |
| 672,678 | A * | 4/1901 | Kitching | 84/470 R |
| 692,736 | A * | 2/1902 | Tinsley | 84/471 R |
| 939,127 | A * | 11/1909 | Giffin | 84/471 R |
| 1,099,372 | A * | 6/1914 | Hughes | 84/471 R |
| 1,319,919 | A * | 10/1919 | Barker | 84/471 R |
| 1,320,746 | A * | 11/1919 | Egener | 84/471 R |
| 1,433,850 | A * | 10/1922 | Schnitker | 84/471 R |
| 1,637,478 | A * | 8/1927 | Downs | 84/471 R |
| 1,666,382 | A * | 4/1928 | Hoffmeister | 84/471 R |
| 1,754,459 | A * | 4/1930 | Cash | 84/470 R |
| 1,803,630 | A * | 5/1931 | Lossie | 84/471 R |
| 1,858,140 | A * | 5/1932 | Dewhirst | 84/471 R |
| 1,879,002 | A * | 9/1932 | Alles | 40/621 |
| 2,072,511 | A * | 3/1937 | Ross | 84/470 R |
| 2,082,432 | A * | 6/1937 | Von Der Linden | 84/471 R |
| 2,164,873 | A * | 7/1939 | Everson | 84/471 R |
| 2,298,081 | A * | 10/1942 | Cohen | 40/622 |
| 2,447,213 | A * | 8/1948 | Sledge | 84/470 R |
| 2,448,302 | A * | 8/1948 | Eyerkuss | 246/473 A |
| 2,742,810 | A * | 4/1956 | Kylin et al. | 84/471 R |
| 2,770,160 | A * | 11/1956 | Ulvad | 84/470 R |
| 2,864,275 | A * | 12/1958 | Fraleigh | 84/471 R |

(Continued)

FOREIGN PATENT DOCUMENTS

GB    2028564 A    3/1980

OTHER PUBLICATIONS

Houlihan, et al. Kodaly Today, (Oxford University Press, 2008) excerpts from Google Books.*

(Continued)

*Primary Examiner* — Robert W Horn
(74) *Attorney, Agent, or Firm* — Patterson Thuente Pedersen, P.A.

(57) ABSTRACT

Progressive systems and methods for enabling music students to easily notate the pitch and/or rhythm of musical compositions using three-dimensional manipulative members representing musical notation symbols. The members are adapted to removably affix to a workspace, such as a magnetic white board surface to notate a musical composition.

18 Claims, 10 Drawing Sheets

(56) References Cited

U.S. PATENT DOCUMENTS

| | | | | |
|---|---|---|---|---|
| 2,879,685 | A * | 3/1959 | Page | 84/470 R |
| 3,186,292 | A * | 6/1965 | Burns | 84/470 R |
| 3,206,744 | A * | 9/1965 | Nelson | 340/815.67 |
| 3,228,133 | A * | 1/1966 | Baermann | 40/621 |
| 3,394,625 | A * | 7/1968 | Grow | 84/471 R |
| 3,429,217 | A * | 2/1969 | Lawrence | 84/471 R |
| 3,520,983 | A * | 7/1970 | Agata | 84/682 |
| 3,530,758 | A * | 9/1970 | Stillo | 84/471 R |
| 3,715,951 | A * | 2/1973 | Lanaro | 84/470 R |
| 3,733,957 | A * | 5/1973 | Peirano et al. | 84/471 R |
| 3,817,145 | A * | 6/1974 | Cohen | 84/471 R |
| 3,991,648 | A * | 11/1976 | Karpowicz | 84/470 R |
| 4,070,944 | A * | 1/1978 | del Castillo | 84/484 |
| 4,306,869 | A * | 12/1981 | Oettinger et al. | 434/305 |
| 4,736,665 | A * | 4/1988 | Sorribes Arambul | 84/471 R |
| 4,819,539 | A * | 4/1989 | Searing | 84/476 |
| 4,832,605 | A * | 5/1989 | Bragin | 434/168 |
| 4,924,743 | A * | 5/1990 | Tsai | 84/476 |
| 5,540,132 | A * | 7/1996 | Hale | 84/470 R |
| 5,949,010 | A * | 9/1999 | Hacker | 84/476 |
| 6,271,453 | B1 * | 8/2001 | Hacker | 84/476 |
| 6,967,274 | B2 * | 11/2005 | Hanington | 84/476 |
| 7,396,988 | B1 * | 7/2008 | Rowe | 84/476 |
| 7,482,524 | B1 * | 1/2009 | Hanington | 84/470 R |
| 7,589,269 | B2 * | 9/2009 | Lemons | 84/483.2 |
| 7,754,954 | B2 * | 7/2010 | Neil | 84/470 R |
| 7,772,476 | B2 * | 8/2010 | Lemons | 84/470 R |
| 8,039,721 | B2 * | 10/2011 | Wold | 84/470 R |
| 8,053,657 | B2 * | 11/2011 | Sitrick et al. | 84/477 R |
| 8,188,356 | B2 * | 5/2012 | Rose | 84/447 |
| 2009/0173212 | A1 * | 7/2009 | Wold | 84/483.2 |
| 2010/0162877 | A1 * | 7/2010 | Charles | 84/483.2 |
| 2010/0288105 | A1 * | 11/2010 | Rose | 84/483.2 |
| 2011/0252946 | A1 * | 10/2011 | Armstrong | 84/483.2 |
| 2016/0253916 | A1 * | 9/2016 | Ashurkoff | G09B 21/004 84/471 R |

OTHER PUBLICATIONS

Davis, Christopher Kodály Rhythm: An Introduction (posted Jul. 9, 2010 at http://www.classicalguitar.org/2010/07/kodaly-rhythm-introduction/, viewed by the examiner Apr. 16, 2014.*

* cited by examiner

MANIPULATIVE SYSTEM FOR TEACHING MUSICAL NOTATION

RELATED APPLICATIONS

This application claims the benefit of U.S. Provisional Patent Application No. 61/324,049 entitled MANIPULATIVE SYSTEM FOR TEACHING MUSICAL NOTATION, filed Apr. 14, 2010, said application being hereby fully incorporated herein by reference.

FIELD OF THE INVENTION

The present invention relates to musical notation systems and more specifically to systems for teaching musical notation in a school music classroom setting.

BACKGROUND OF THE INVENTION

Increasingly, outcome-based standards for school music education expect that even young primary students be required to compose original music compositions and that the teacher keep a record of each child's compositions. The physical act of writing music presents challenges for children as their school days become filled with the act of using their pencils to learn to write the spoken and mathematical languages. Varying degrees of development in fine motor coordination can slow down the creative process, especially when creating the music becomes about the physical act of dictating the music symbols precisely onto paper. Using the computer to compose in a music classroom is not practical, due to the expense of the technology itself and the learning curve required for children to learn to use the technology. Nor are computerized music notation systems developmentally appropriate for younger children. For these reasons, manipulatives including three-dimensional tactile shapes, appear to be the answer.

Previous attempts at musical notation systems that use such manipulatives include various worksheet systems produced by the Macmillian© company, and other systems such as disclosed in U.S. Pat. No. 6,967,274, and Great Britain Patent Application GB 2,028,564. In the Macmillan© worksheets for primary students, paper assignments have printed notes or other symbols that must be cut out with a scissors and glued onto a worksheet to create an original composition. Although this method may be easier for some children than writing music notation, the cutting and gluing steps introduce time consuming busy work and also physically slows down the creative process. In addition, because the musical instructional time with children is generally limited, it is not efficacious to use music class time for purposes of learning to cut and paste. Regular classroom teachers who might have the space and materials with which to supervise these projects are not likely to choose to do so because there are so many pressures to work on other academic areas besides music, such as math and reading.

U.S. Pat. No. 6,967,274 discloses a system including a set of blocks which may help some children conceptualize time and rhythm in music. The blocks, however, have varying thicknesses representing the time value of the musical symbol they represent. As a result they are bulky, rendering them not practical or facile for classroom assignments with large groups of children. Further, the disclosed system does not address the concept of pitch at all, and is not progressive so as to enable students to advance to more advanced notational concepts as they learn.

Great Britain Patent Application GB2028564 discloses a matching game designed to teach music symbol terminology "subconsciously" by enabling game players to win various musical systems by the roll of dice, and then to place the symbol won over an identical preprinted symbol on the game board. Drawbacks of this game are that it is not designed to teach actual musical concepts (such as note value or pitch value), is not progressive, and does not aid in the composing of music.

Further, lessons have been developed for use with interactive whiteboards, such as Smart Boards, wherein musical notation symbols can be drawn on the interactive board with a finger or pen. A drawback of these lessons, however, is that they require the student to draw symbols. Such fine motor coordination is often beyond the capability of young children.

What is still needed is a simpler, more effective, progressive way of enabling children to easily notate the pitch and/or rhythm of their music compositions.

SUMMARY OF THE INVENTION

Embodiments of the present invention meet the need for a simpler, more effective, progressive way of enabling children to easily notate the pitch and/or rhythm of their music compositions by providing a facile, manipulative system for children to notate rhythm or pitch and, eventually, both rhythm and pitch together. The system includes a set of magnetic music symbols which students can removably affix to a workspace, such as a magnetic white board surface. In embodiments of the invention, the surface of the workspace may be written on with an erasable marker.

Embodiments of the invention for primary learners may include two magnetic board surfaces. One surface can be blank and to which students can attach stick style rhythm symbols to notate rhythmic compositions. An eraseable marker can be used to add pitch symbolism to the composition using solfège initials. On the second surface, indicia including a wide-lined staff can be pre-printed thereon. Students can notate pitches on the staff using magnetic oval note heads. The students may later add magnetic stems to the note heads to add rhythm to their melody as they are ready.

Embodiments of the invention may further include different kits of magnetic music symbols arranged progressively for attaching to the surfaces. In exemplary embodiments, the progression of the more basic kits can include any or all of: (1) a stick rhythm kit with quarter and eighth note pair sticks and quarter rest shapes, and basic expression marks such as p, f and m; (2) a set of black pitch ovals; (3) a set of quarter and individually flagged eighth note sticks to attach to the pitch ovals, and eighth rests; (4) a set of empty ovals for whole notes and for spelling half notes, and half and whole rest symbols; (5) bar lines, double bar, repeat sign and the numbers 2, 3 and 4 for notating a basic time signatures using a number on top of a quarter note with the stem down; (6) small dot magnets for building various dotted rhythms, and sixteen notes and sixteenth rests; and (7) quarter, half, eighth and sixteen notes (both flagged individually and in preset sets equaling one beat), all with pre-attached stems for facility. These pre-attached symbols may be used when students have mastered the concept that the placement of the oval alone designates relative pitch and that the rhythmic value is determined by the type of note shape or color of the note head used.

Systems for more advanced learners can include a work surface with more narrowly lined staves. Corresponding advanced symbol kits may be less thick being simply constructed of printed magnets and progress as follows: (1) smaller symbols to correspond to the more narrow staff lines, including a treble clef symbol, time signatures 2/4, 3/4, and 4/4, quarter, half, eighth and sixteen notes (both flagged individually and in preset sets equaling one beat), all with pre-attached stems for facility plus whole notes, and quarter, half, and whole rests, and dotted eighth, quarter, and half notes and dotted eighth, quarter and half rests; (2) bass clef, moveable c clefs, 5/4 time signature, individual sharps and flats as well as key signature sheets with flats and sharps and a clear background that fit the smaller staff and can be tacked down by the clef and time signature placement; and (3) time signatures of 3/8 and 6/8 with corresponding preset sets of various rhythms and rests equaling one beat in 3/8 and 6/8 time; and (4) various tempo, dynamic, and other expression phrases.

When a composition is finished, an eraseable marker can be used to add other dynamics and other expression markings as assigned. The name and identifying class of the student can be marked with an erasable marker for identification. Further, the work can be easily photographed with a digital camera. After it is recorded digitally, the assignment can be saved into a soft or hard portfolio, enlarged and printed on paper for practice or performance, or projected onto a computer connected interactive white-board, such as a Smart™ board for the whole class to read and perform as desired.

Because of the uniformity of the magnetic symbols, a child's tactile understanding of the kits through manipulation promotes better eventual "penmanship" for writing music, and corrections on an assignment are as simple as picking up the magnet and moving it or replacing it. This improves the chances for individual success and promotes easy reading by the student and their classmates. This method gives focus to the creative process and to the tonal/rhythmic content of the composition instead of the fine motor development of the individual child.

In other embodiments of the system of the present invention, the symbol sets can be used for rhythmic and/or melodic dictation assignments where the teacher sings or plays a rhythm or melody and the students replicate it on their individual board. Because the boards and magnets are easily read from a distance, the teacher can use and reuse them to notate rhythms or melodies, either with the marker or the magnets, to be read by the entire class for various lessons. Many boards in succession can be used to notate a longer composition. For instance, boards can be set end to end on a ledge along the classroom black/white board, or may be light enough to sit on music stands placed in a row. A side of the board that is blank can also have multiple classroom uses, musical and otherwise, just like a regular white board.

Accordingly, an embodiment of a manipulative system for teaching musical notation includes a generally planar workspace and a plurality of three-dimensional members adapted to be removably affixable to the workspace, each of the three-dimensional members indicative of a musical notation symbol. The plurality of three-dimensional members may includes member indicative of a whole-note, a half-note, a quarter-note, an eighth-note, or a sixteenth-note. The plurality of three-dimensional members may include a shorthand rhythm notation member. The shorthand rhythm notation member may be an elongate, substantially straight member indicative of a quarter-note. The shorthand rhythm notation member may also be a pair of spaced-apart elongate substantially straight members coupled at one end of each of the pair of straight members with a third straight member disposed at substantially a right angle to each of the pair of straight members, the shorthand rhythm notation member indicative of a pair of eighth-notes. The plurality of three-dimensional members may include a generally oval shaped note-head member. The plurality of three-dimensional members may include at least one elongate stem member, the stem member having one end conformingly shaped with the generally oval shaped note-head member so as to define a note symbol when the conformingly shaped end of the stem member is abutted with a perimeter of the generally oval shaped note-head member.

In embodiments, the workspace may be a magnetic white-board, and each of the plurality of three-dimensional members may include a magnet for removably affixing the member to the magnetic white-board. The workspace may have musical staff indicia thereon.

In other embodiments, a method for teaching musical notation includes providing a generally planar workspace and a plurality of three-dimensional members adapted to be removably affixable to the workspace, each of the three-dimensional members indicative of a musical notation symbol, dictating sounds of a musical composition, and instructing a student to arrange the three-dimensional members on the workspace to properly musically notate the musical composition. In other embodiments, the method may further include determining whether the three-dimensional members are properly arranged to notate the musical composition and correcting the arrangement of the three-dimensional members if the notation is in error. The method may also include anchoring an initial pitch to a musical staff line depicted on the workspace. In embodiments, the workspace may be divided into a plurality of beat boxes, and the method may further include instructing the student to arrange the plurality of three-dimensional members in the beat boxes according to a beat of the musical composition.

In other embodiments, a manipulative system for teaching musical notation includes a generally planar workspace having indicia marked thereon, and a plurality of three-dimensional musical notation symbol members selectively attachable to the workspace to notate a musical composition. The indicia may include beat boxes or a musical staff. The workspace may include a plurality of illuminable elements, and the system may further include apparatus for illuminating the illuminable elements in time with a beat of a musical composition.

The above summary of the various representative embodiments of the invention is not intended to describe each illustrated embodiment or every implementation of the invention. Rather, the embodiments are chosen and described so that others skilled in the art may appreciate and understand the principles and practices of the invention. The figures in the detailed description that follows more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
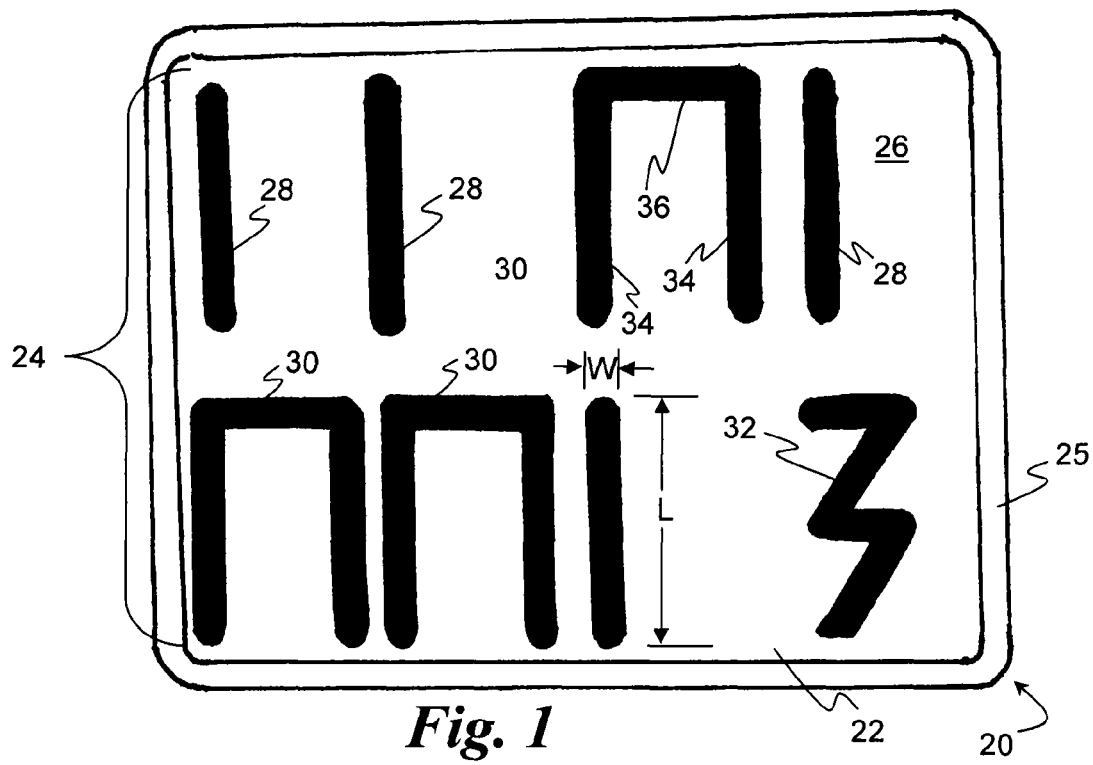
FIG. 1 is an elevation view of a primary system for teaching rhythm notation to beginning learners according to an embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives.

DETAILED DESCRIPTION OF THE PREFERRED EMBODIMENTS

Figure 2:
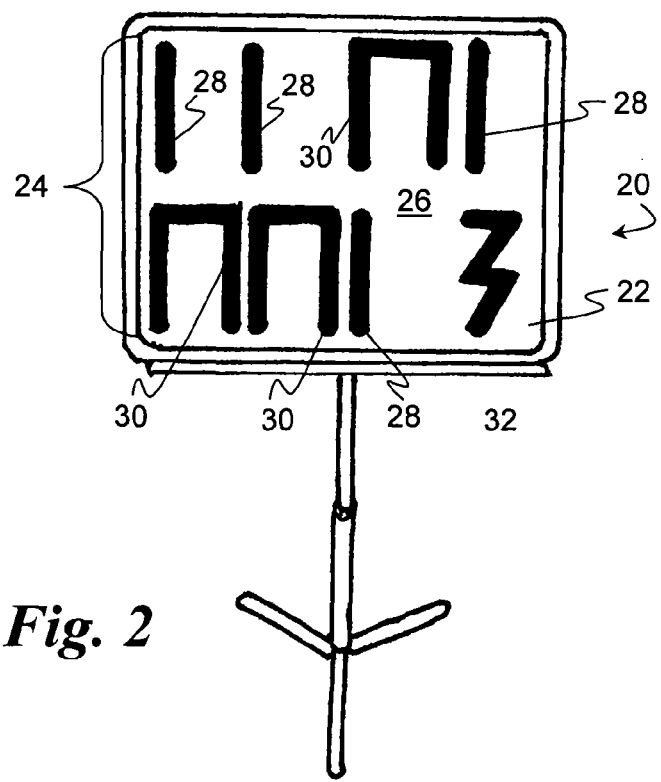
FIG. 2 is a perspective view of the system of FIG. 1 disposed on a stand.

A system 20 for teaching rhythm notation to beginning students is depicted in FIGS. 1 and 2. System 20 generally includes a workspace 22, and manipulative notation member set 24. In an embodiment of the invention, workspace 22 may be a common commercially available white board 25 presenting a smooth magnetic surface 26 that can be erasably marked using dry-erase markers (not shown).

Figure 8:
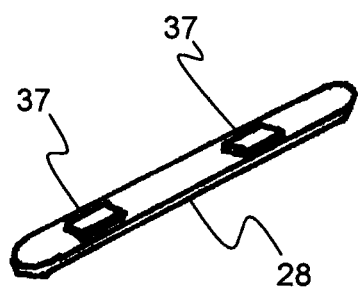
FIG. 8 is a rear perspective view of one member of the primary system of FIG. 1.

Primary manipulative notation member set 24 generally includes a plurality of shorthand rhythm notation members, such as quarter-note members 28, eighth-note members 30, and quarter-rest member 32. In embodiments of the invention, quarter-note members 28 and quarter-rest member 32 may have a single piece unitary wood or plastic body. Eighth-note members 30 may be similarly formed from a single piece of wood or plastic, or alternatively, may be formed using two separate spaced-apart vertical members 34 connected by a horizontal member 36 permanently adhered to the vertical members 34. As depicted in exemplary fashion in FIG. 8, each of quarter-note members 28, eighth-note members 30, and quarter-rest member 32 have a one or more magnets affixed to the back side thereof to enable each quarter-note member 28, eighth-note member 30, and quarter-rest member 32 to removably adhere to magnetic white board 25 as depicted in FIG. 2.

Figure 6:
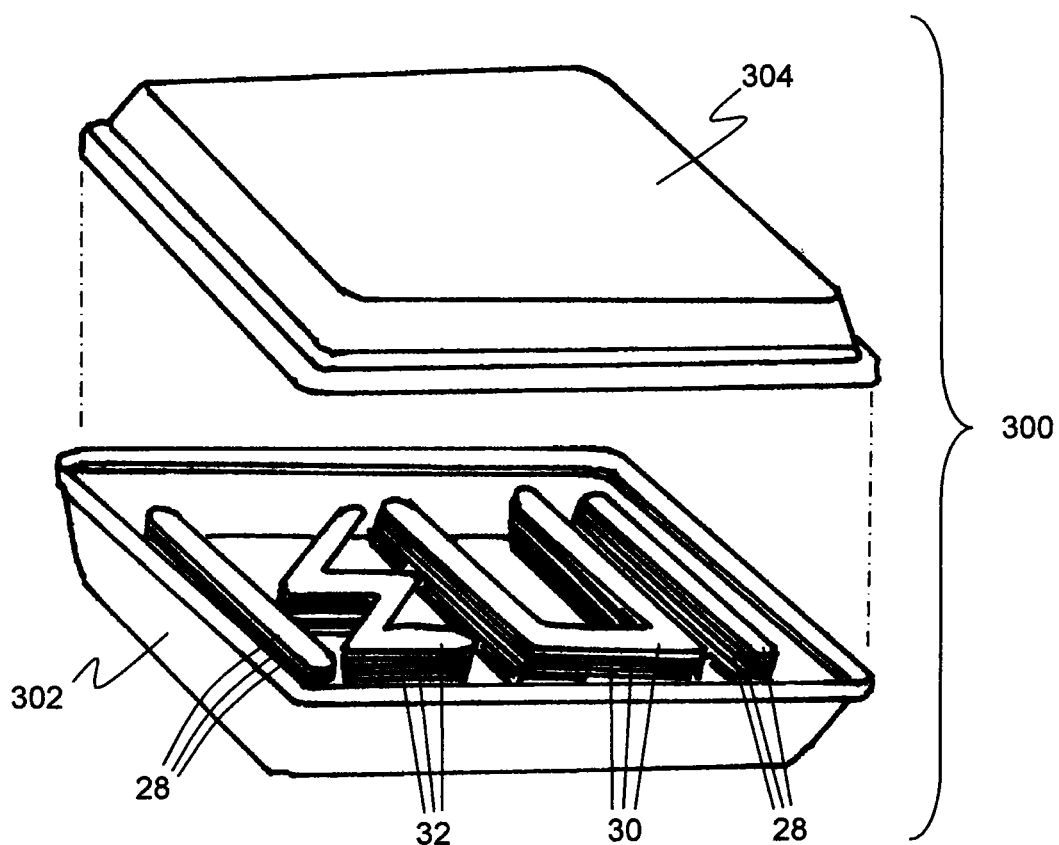
FIG. 6 is a perspective of a manipulative system for teaching musical notation including manipulative members and a container for storing the members.

Quarter-note members 28, eighth-note members 30, and quarter-rest members 32 preferably have dimensions suitable for easy manipulation by young children having less developed fine motor skills. For instance, in embodiments of the invention, each symbol in notation member set 24 may have a length dimension "L" of between about 2.5 inches to about 6 inches, a width dimension "W" of between about ⅜ inch to about 1 inches, and a thickness of between about ¼ inch to about ⅝ inch. These dimensions also enable notation member set 24 to be gathered in a compact form for storage or transport. As depicted in exemplary fashion in FIG. 6, quarter-note members 28, eighth-note members 30, and quarter-rest members 32, may be packaged conveniently in container 300, which generally includes base portion 302 and cover 304.

Figure 7:
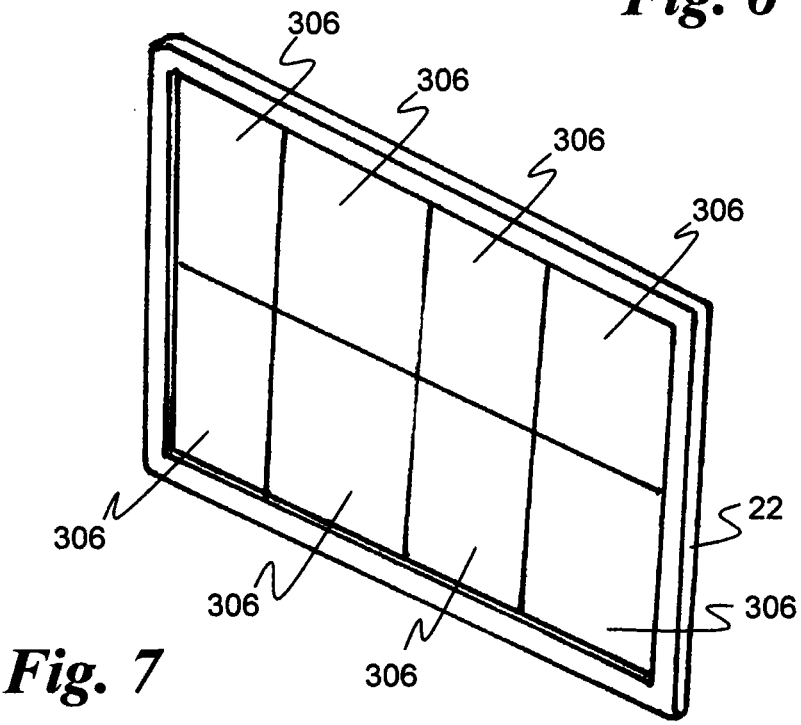
FIG. 7 is a perspective view of a workspace portion of an embodiment of the invention.

In use, the students in a music classroom may individually or in small cooperative groups replicate rhythms played by the teacher, a recording, or another student by translating what they hear into their learned rhythm language (such as "ta" for one sound on a beat and "ti-ti" for two sounds on a beat) and then notating the rhythm on workspace 22 with quarter-note members 28, eighth-note members 30, and quarter-rest members 32. The teacher may guide the children to divide their board into beat boxes with the eraseable marker in preparation for the dictation exercise, each representing a single musical beat. For example, as depicted in exemplary fashion in FIG. 7, workspace 22 is divided into eight beat boxes 306, which is a typical division for beginners. This division assists with understanding the concept of one sound or two sounds on a beat, and later with the concept of a half or whole note being held "through" multiple beats, and it also assists students with appropriate, readable spacing in their notation. After students have mastered the dictation of 4 beat rhythms, they can dictate 8 beats of rhythm. These patterns can easily be read from the boards for the students to reproduce in performance using voice, body percussion, and/or classroom instruments.

After mastering the dictation of short individual rhythm patterns, students may be challenged to discern and dictate a repeated rhythmic pattern from a single voice in a complex listening example, such as the rhythmic pattern of a bass ostinato accompanying a song. Once correctly notated, these patterns can easily be read from the boards for the students to reproduce in performance using voice, body percussion, and/or classroom instruments.

After more facility with notating and reading rhythms is developed, students, individually or in small groups, can notate original compositions using the set. These patterns can be recorded with a digital camera and then projected or printed for evaluation, performance, and for record keeping. As time allows, the students can also add the dimension of pitch to their rhythms later by adding the initials of solfège syllables under the rhythm symbols as well as determining expression such as dynamics and tempo.

Figure 3:
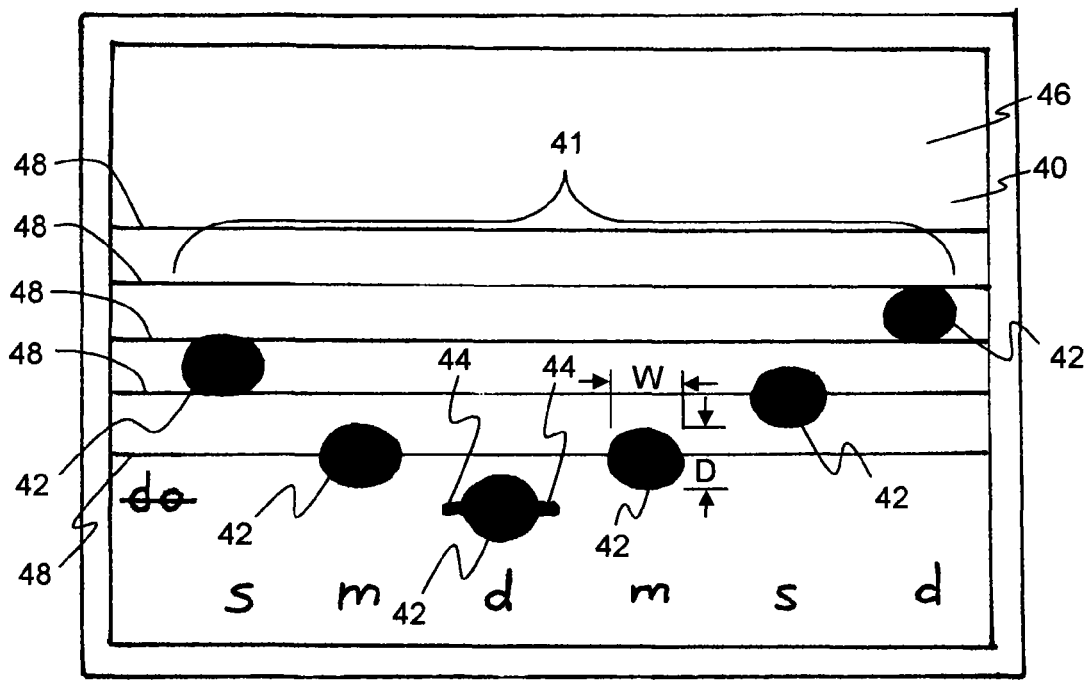
FIG. 3 is an elevation view of a primary system for teaching pitch notation to more advanced learners.

In another embodiment as depicted in FIG. 3, system 38 for teaching pitch notation for beginning students generally includes workspace 40 and manipulative notation member set 41 Workspace 40 may be a magnetic white board 46, and in embodiments of the invention may include staff lines 48 permanently or temporarily marked thereon.

The exemplary embodiment of primary pitch notation member set 41 depicted in FIG. 3 generally includes note head members 42 and, optionally, ledger-line members 44. Note head members 42 may be formed from a single piece of wood, plastic, or thick craft foam with a magnet (not depicted) affixed to the back side thereof. Again, the dimensions of note head members 42 are selected so as to accommodate easy manipulation by young children having less developed fine motor skills. In exemplary embodiments of the invention, note head members 42 may have a width dimension of between about 1½ to 2 inches, and a thickness of about ¼ inch to ½ inch.

In use students, individually or in small groups, can use the primary pitch set to notate a series of pitches sung or played by the teacher, or played on a recording or by a student. The teacher tonally "anchors" the notation by explaining where either "do" or "so" belongs and playing or singing the anchor pitch. (i.e.—explains that "so" is on the second line from the bottom, and then sings the "so" pitch) Initially, the teacher might sing a series of just 2 or 3 pitches using the solfège syllables starting on the "given" pitch of "so" and using the combination of "so" and "mi". As the students become more facile at hearing tonal distance, the teacher will reveal only the name of the first pitch and students will then calculate the other pitches in the series. As students' pitch skills and vocabulary advance, so can the length and complexity of the tonal dictation just as in a typical Kodály-style sequence.

When students have developed their ability to dictate tonal simple tonal patterns they may then advance to longer, more challenging sequences. They may discern and notate a melodic pattern from a voice, such as an obbligato form in a more complex recording. They may also notate and their own melodies using the pitch ovals and then perform their melody on a classroom instruments such as a xylophone.

Figure 4:
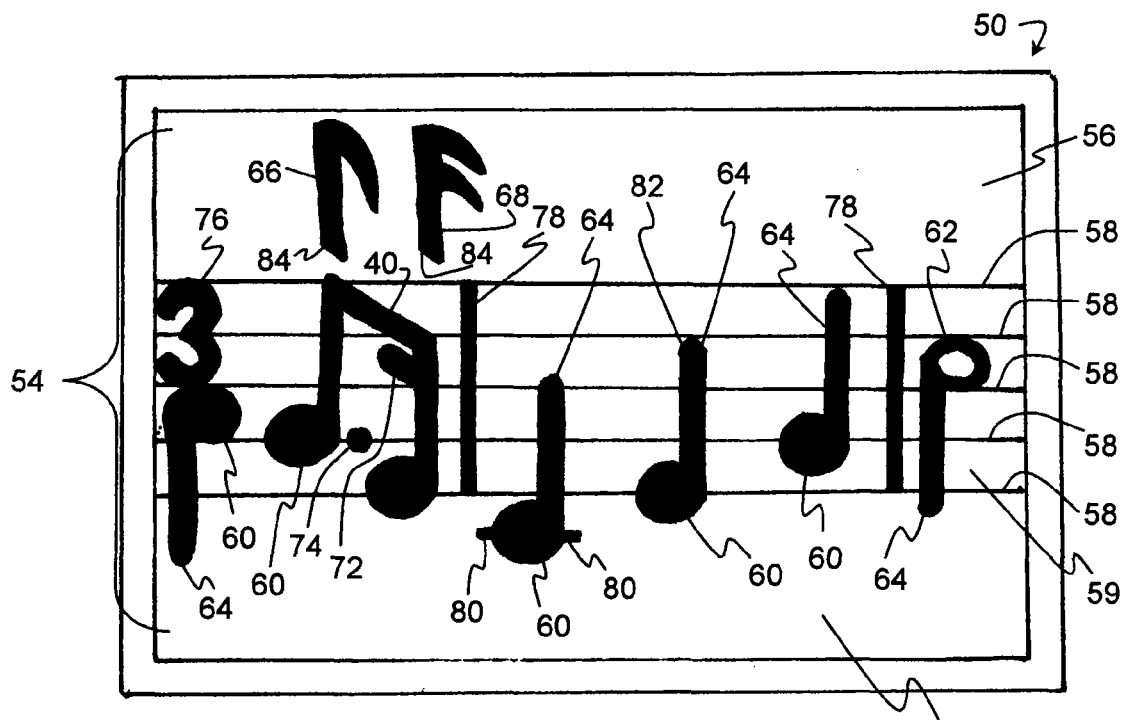
FIG. 4 is an elevation view of an intermediate system for teaching rhythm and pitch notation.

In a further embodiment depicted in FIG. 4, intermediate system 50 for teaching more advanced rhythm and pitch notation concepts generally includes workspace 52 and notation set 54. Again, workspace 52 may be a magnetic white board 56 which may have staff lines 58 forming a staff 59 permanently or temporarily marked thereon.

Figure 9:
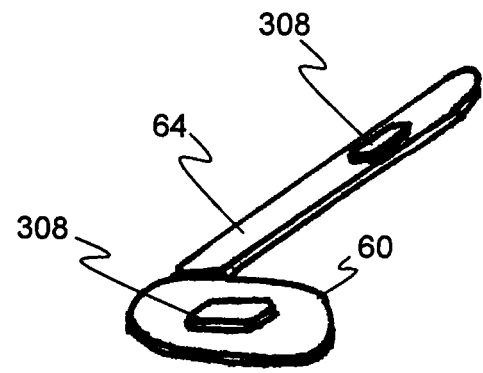
FIG. 9 is a rear perspective view of one member of the intermediate system of FIG. 4.

The exemplary embodiment of notation set 54 depicted in FIG. 4 generally includes solid note heads 60, half-note heads 62, stems 64, eighth note flags 66, sixteenth note flags 68, full beams 70, partial beams 72, note dots 74, time signature numbers 76, bar lines 78, and ledger-line members 80. Each member of notation set 64 may be formed from wood, plastic, or thick craft foam and each has a magnet 308 affixed to the back side thereof as depicted in exemplary fashion in FIG. 9, to enable the member to be removably adhered to white board 56. It will be appreciated that notation set 54 may include any desirable number of each symbol and any desirable combination of symbols, and may additionally include expression marks such as f, m, p, crescendo, decrescendo, allegro, andante, adagio, largo, legato, and staccato. It will further be appreciated that the symbols included in notation set 54 may be provided separately, to enable users to select combinations of symbols suited to different teaching objectives, and may be stored in a container 300, as depicted for primary rhythm set 24. For example, the student might first compose a single phrase using words of their choosing, add pitches on the staff to correspond with the words, and then add on stems, beams etc. to add rhythmic notation to their pitch. This synthesized assignment could be performed by the student and further polished by the student by making expression and instrumentation decisions and then performed.

In an embodiment, stems 64 are elongate with a rounded end 82. The end opposite rounded end 82 may be shaped so as to conform with the periphery of solid note heads 60 and half-note heads 62. Such conformingly shaped ends 84 are depicted in FIG. 4 on eighth note flags 66 and sixteenth note flags 68. Alternatively, both ends of stems 64 may be similarly shaped, and a conformingly shaped recess or pocket to receive an end of stem 64 may be defined in solid note heads 60 and half-note heads 62. Similarly, the ends of beam 70 may be conformingly shaped to end 82 of stem 64 or may define structure to receive end 82. In still further embodiments, beam 70 may be pivotally attached to one or more of stems 64.

In use, the advanced students can use intermediate system 50 for increasingly more complex and lengthy dictation and composition as they learn the more complex rhythms and tonalities that can be notated by this set. Compositions may include harmony or polyphony by combining "voices" notated on various boards or added to previously recorded compositions. Young composers will achieve dexterity and understanding of different meters using their self-selected time signatures and by placing the members correctly.

Figure 14:
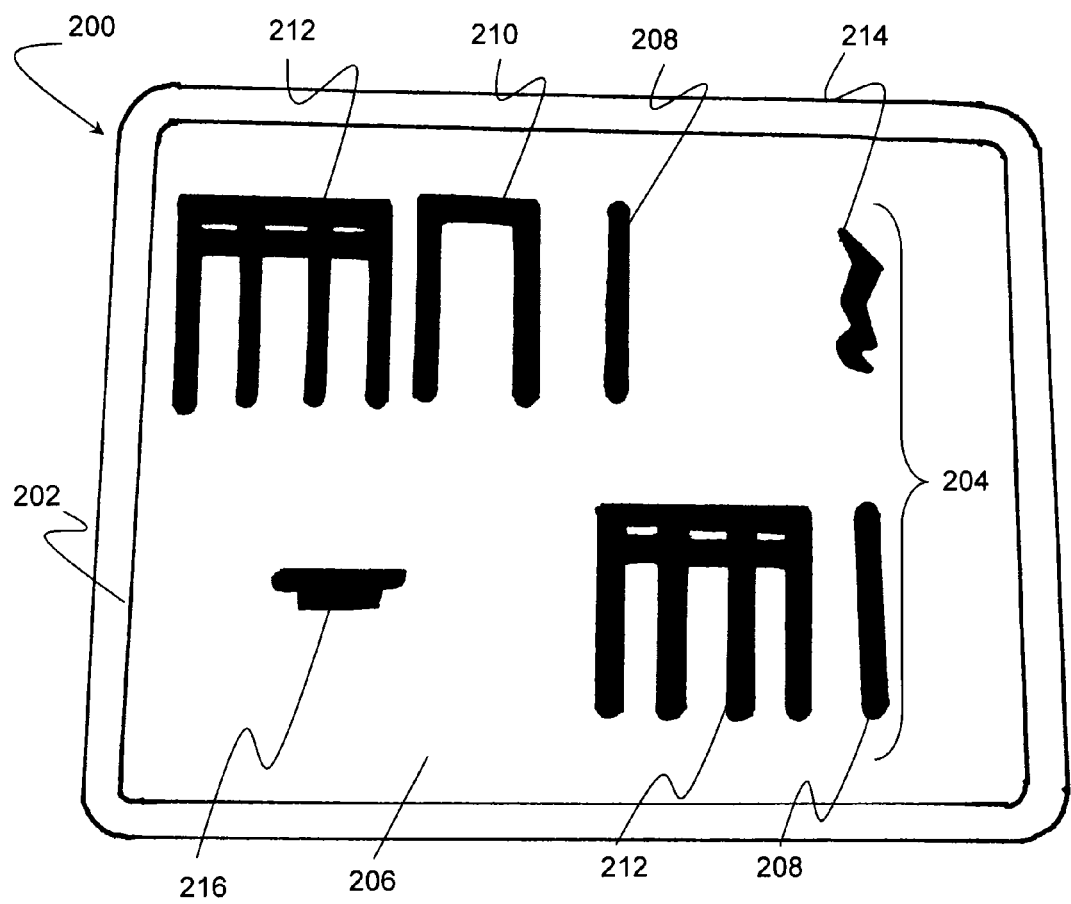
FIG. 14 is an elevation view of an intermediate system for teaching rhythm notation.

In an alternative embodiment depicted in FIG. 14, intermediate system 200 for teaching rhythm notation concepts generally includes workspace 202 and notation set 204. Again, workspace 202 may be a magnetic white board 206.

The exemplary embodiment of rhythm notation set 204 depicted in FIG. 14 generally includes quarter-note members 208, eighth-note members 210, sixteenth note members 212, quarter-rest member 214, and reversible whole/half rest members 216. Again, each member of notation set 204 may be formed from wood, plastic, or thick craft foam and each has a magnet (not depicted) affixed to the back side thereof, to enable the member to be removably adhered to white board 206. Use of intermediate system 200 may be generally as described above for the other sets.

Figure 5:
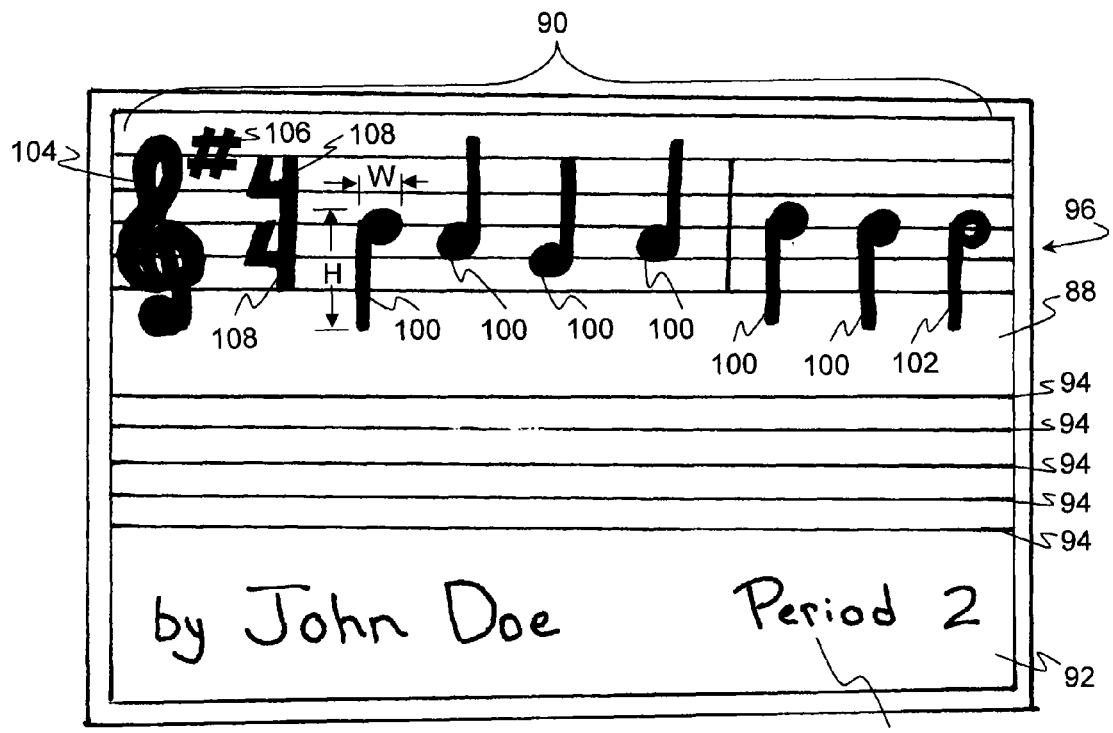
FIG. 5 is an elevation of an advanced system for teaching more advanced notation concepts to advanced learners.

In a further embodiment depicted in FIG. 5, advanced system 86 for teaching rhythm and pitch notation concepts to still more advanced learners generally includes workspace 88 and notation set 90. Again, workspace 88 may be a magnetic white board 92 which may have staff lines 94 forming one or more staffs 96 permanently or temporarily marked thereon. One or more blank regions 98 may be provided to enable marking of indicia such as a student's name and class information.

The exemplary notation set 90 depicted in FIG. 5 generally includes quarter-notes 100, half-notes 102, treble clef 104, key signature symbol 106, and time signature numbers 108. It will be appreciated that notation set 90 may include any desirable number of each symbol and any desirable combination of symbols, and may additionally include time signatures numbers 2, 3, 5, 6, 7 and 8, quarter, half, eighth and sixteen notes (both flagged individually and in sets equaling one beat), all with pre-attached stems for facility plus whole notes, and quarter, half, and whole rests, and dotted eighth, quarter, and half notes and dotted eighth, quarter and half rests; bass clef, moveable c clefs, individual sharp and flat signs as well as key signature sheets with flats and sharps and a clear background that fit the smaller staff and can be tacked down by the clef and time signature placement; and preset sets of various rhythms and rests equaling one beat in 3/8 and 6/8 time; and various tempo, dynamic, and other expression phrases. It will further be appreciated that the symbols included in notation set 90 may be provided separately, to enable users to select combinations of symbols suited to different teaching objectives. Again, notation set 90 may be stored in a container 300, as depicted for primary rhythm set 24. For example, the 3/8 and 6/8 magnets might be contained in a separate supplemental kit along with extra dotted quarter notes, dotted quarter rests, sets of 3 eighth notes connected by a hinged beam as well as separate flagged eighth, dotted eighth and sixteenth notes, and eighth and dotted eighth rests and small beam sections for easy completion of and combination of dotted eighth and sixteenth rhythms in 3/8 or 6/8 time.

In that system 86 is generally intended for more advanced learners having well-developed fine motor skills, the symbols such as quarter-notes 100 and half-notes 102 may be made with the note head and stem as a single piece and printed on magnet sheets in smaller dimensions. For example, the height dimension H of quarter-notes 100 may be between about 2 and 3 inches with a width dimension of from about 3/8 inch to 1 inch.

In use students will be able to again complete assignments in music dictation, notation, and composition but, because of the size and complexity of symbols, the assignments will have the potential for increasing length and rhythmic, tonal, and textural complexity.

It will be appreciated that any of the above described manipulative systems could be used with an interactive whiteboard or display such as those produced by Smart Technologies of Calgary, Alberta, Canada, and sold under the trade name Smart™ Board. In this embodiments, the manipulative symbols can be placed on the interactive whiteboard as with the magnetic whiteboards mentioned above. The computer connected with the interactive whiteboard can be programmed with suitable algorithms for performing various desired actions. For example, the algorithm can enable instant recording of the composition once arranged by the student. In another example, the algorithm might dictate a rhythm pattern using the sound output of the computer and invite the student to duplicate the pattern by arranging the manipulative symbols on the interactive whiteboard. The algorithm can then detect the symbols as they are placed on the board, and provide feedback (e.g. produce a flashing red background) if the symbols are not placed properly or different feedback (e.g. green background) once the symbols are properly placed. Those of ordinary skill will appreciate that, consistent with the present invention, a nearly infinite number of such algorithms can be developed for use with the manipulative symbols described, facilitating a wide variety of interactive lessons and games useful in musical instruction.

Figure 11:
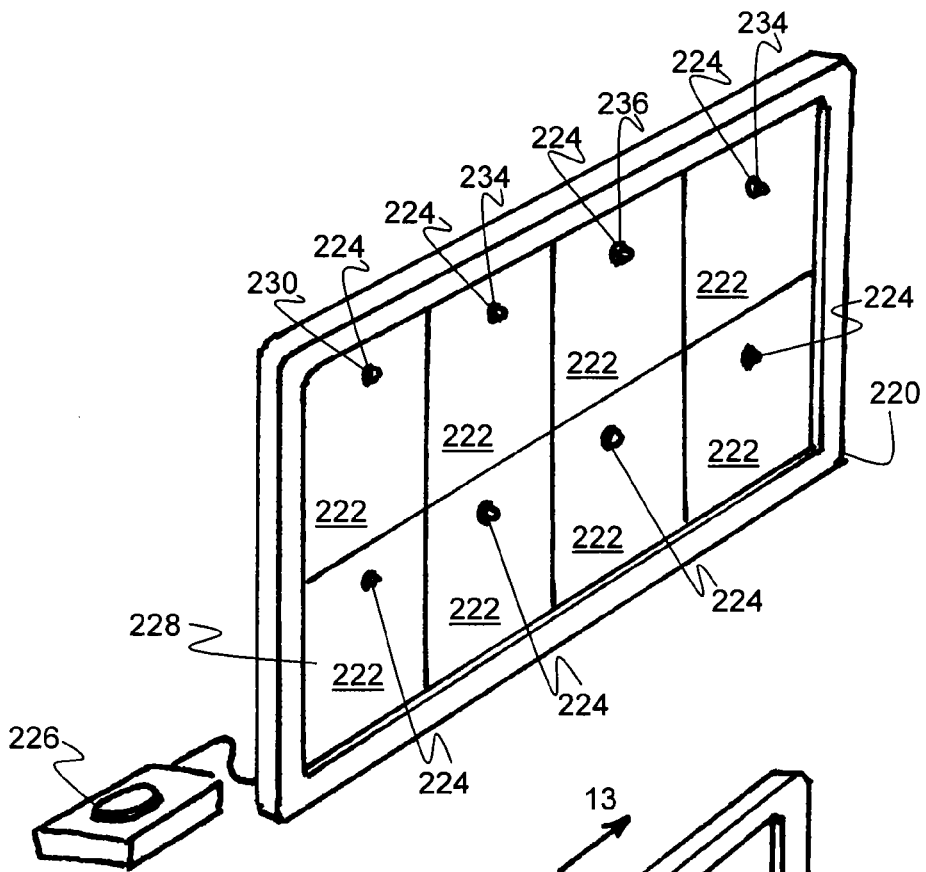
FIG. 11 is a perspective view of a workspace including visual indicia for dynamically depicting rhythm counting according to embodiments of the invention.

In other embodiments, various alternative embodiments of a workspace may be used to assist students in grasping concepts of rhythm counting, and to enable instruction of students with hearing or vision impairments. For example in an embodiment depicted in FIGS. 11 and 11A, workspace 220 may be divided into beat boxes 222, each representing one musical beat and equipped with an indicator lamp 224, which may be an LED. A metronome 226 may be communicatively coupled with the indicator lamps 224, so as to actuate indicator lamps 224 sequentially on each beat produced by metronome 226. The sequence of lamp actuation proceeds beginning in the upper-left corner of workspace 220 and proceeding left to right across the top row of beat boxes 222, and then to the bottom left beat box 228 and across the bottom row of beat boxes 222. As each successive indicator lamp 224 is illuminated, the previous lamp is extinguished. Metronome 226 may be set to any number of beats per minute so as to select the speed of lamp actuation. For example, if the metronome is set to 60 beats per minute, the lamps 224 will be successively actuated and extinguished at a rate of one lamp 224 per second. It will be appreciated by those of ordinary skill that metronome 226 could be replaced with a computer programmed with a suitable algorithm to replicate the function of metronome 226 and communicatively connected with indicator lamps 224 through an interface such as a USB interface as is well known in the art.

Figure 11A:
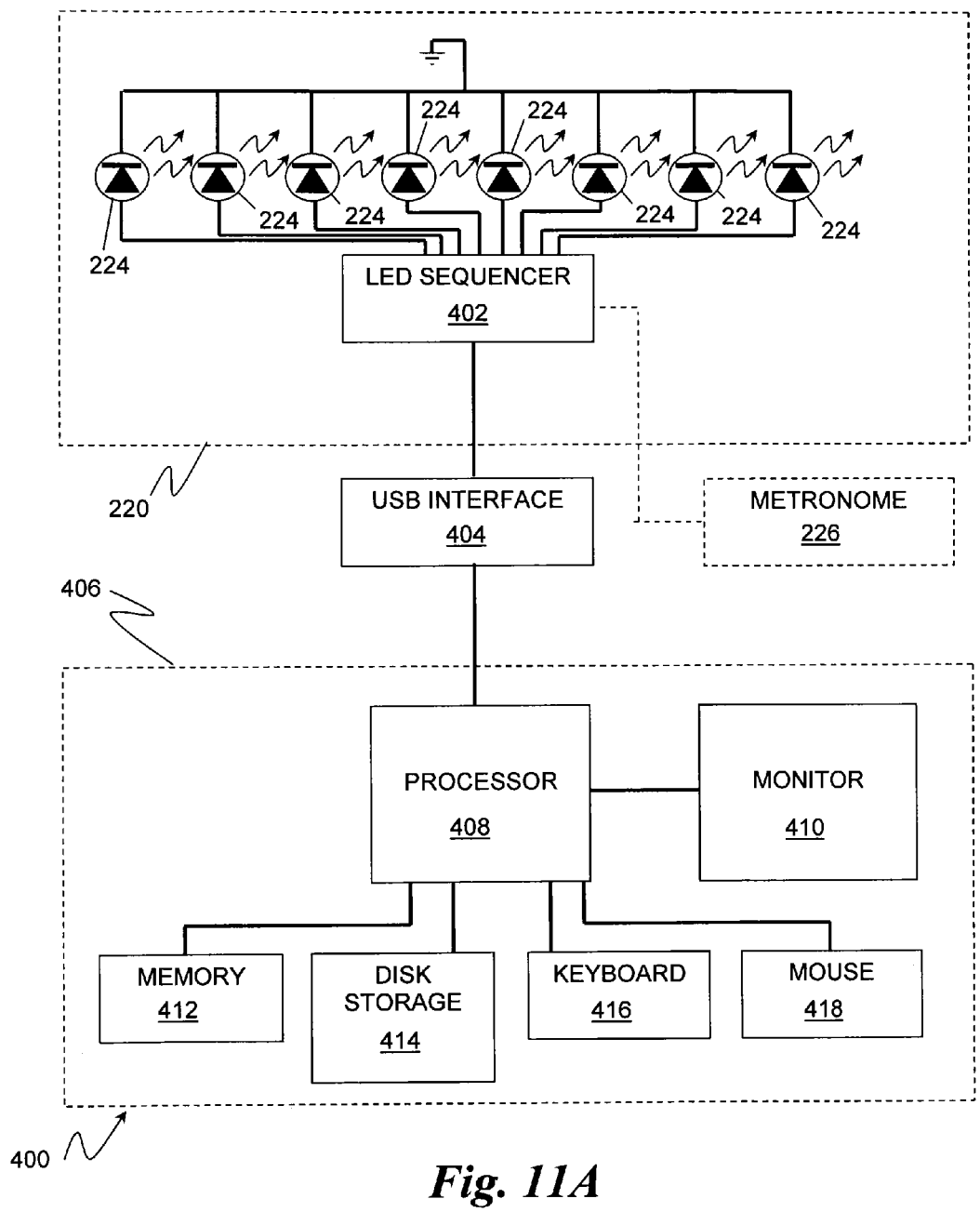
FIG. 11A is a simplified schematic block diagram of a system including the workspace of FIG. 11.

For example as depicted in simplified block schematic form in FIG. 11A, system 400 generally includes workspace 220 with indicator LEDs 224 as previously described, LED sequencer module 402, and optionally USB interface 404, and personal computer 406. LED sequencer module 402 may be a circuit constructed around a well-known 4017B decade counter integrated circuit, the output pins of which are connected to indicator LEDs 224. The clock input of the 4017B decade counter is coupled to either an output of a metronome 226, or optionally USB interface module 404 if used with personal computer 406. Clock pulses provided by metronome 226 or through USB interface 404 provide a signal causing the 4017B decade counter to sequentially light and extinguish LEDs 224 in time with the clock pulses.

Personal computer 406 may be any commonly available Windows or Macintosh compatible computer, and may generally include processor 408, display monitor 410, memory 412, disk storage 414, keyboard 416, and mouse 418. The processor may be programmed with a commonly available metronome program or more fully capable music composition program such as, for example GarageBand available from Apple® Inc., that is capable of generating a metronome beat.

Students can then place suitable symbols in each beat box 222 corresponding to the full value represented by the beat. For example, using set 200 and 4/4 time, where each beat box 222 represents one quarter note, the box could be filled with one quarter-note member 208, one eighth-note member 210, one sixteenth note member 212, or one quarter-rest member 214. Once the members are placed, metronome 226 can be actuated to actuate lamps 224 in sequence, and the student can clap or sing along to the beat in accord with the symbols in each beat box 222. For example, if beat box 222 contains a quarter-note member 208, the student would clap once when the indicator lamp 224 for that beat box 222 is illuminated. If beat box 222 contains an eighth-note member 210, the student would clap twice when the indicator lamp 224 for that beat box 222 is illuminated, if beat box 222 contains a sixteenth note member 212, the student would clap four times when the indicator lamp 224 for that beat box 222 is illuminated and so on. For cases where the value of the member may span more than one beat box 222, as in the case of reversible whole/half rest member 216, the student would refrain from clapping as successive lamps 224 are illuminated, until the full value of the member 216 has been reached. An advantageous feature of this embodiment is that students will full or partial hearing impairment can physically participate in learning rhythm concepts, even while not necessarily being able to hear sounds. In addition, the embodiment can be useful in teaching rhythm concepts to students having difficulty in grasping the meaning ascribed to the various symbols 208, 210, 212, 214, and 216.

To further reinforce more advanced rhythm counting concepts, indicator lamps 224 may be provided in different colors to indicate beat emphasis. For example, lamp 230 may be red, lamp 232 may be an orange color, and lamps 234 may be yellow to indicate the relative emphasis placed on each of these beats. In an embodiment of the invention, this function may be effectuated through the use of multi-color LEDs in which the color of LED is selectable with an algorithm programmed on a computer replacing metronome 226.

Figure 15:
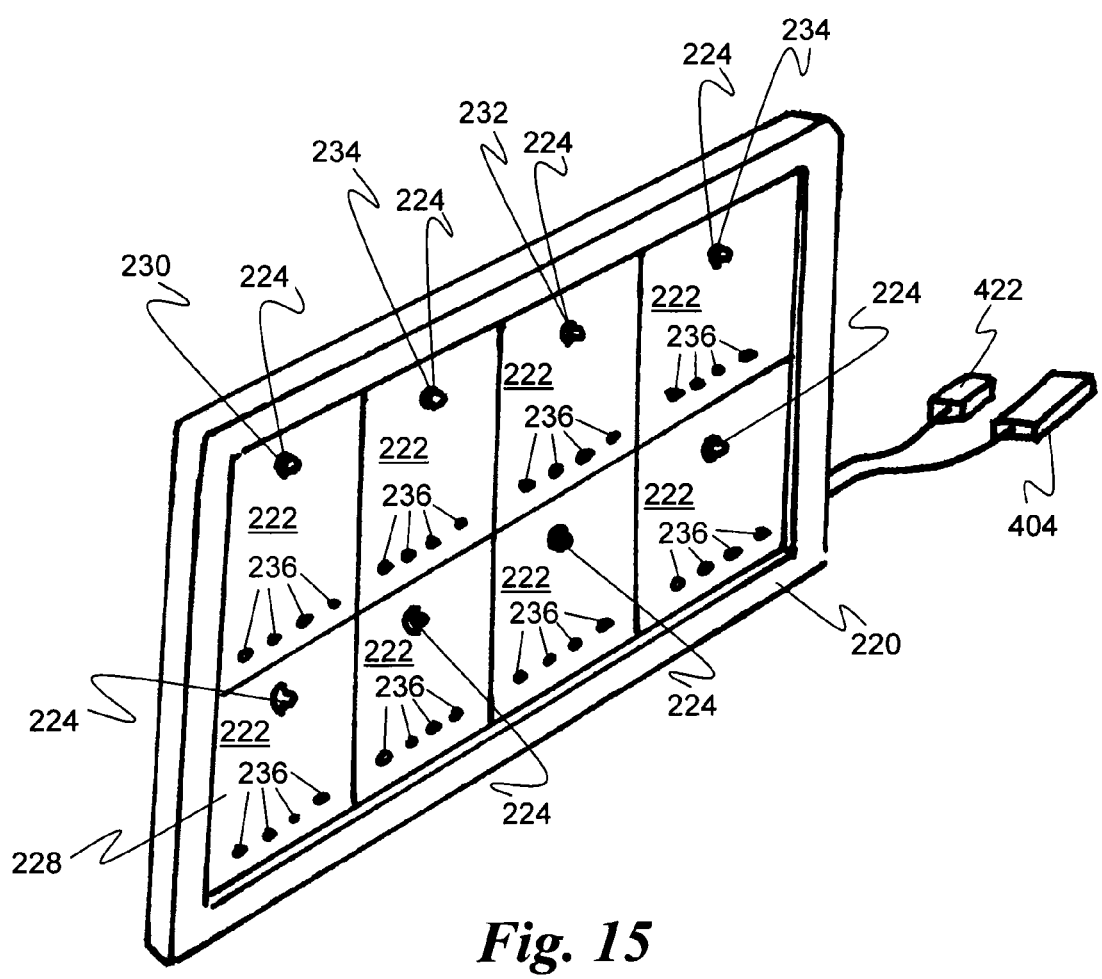
FIG. 15 is a perspective view of a workspace including visual indicia for dynamically depicting rhythm counting according to embodiments of the invention.
Figure 16:
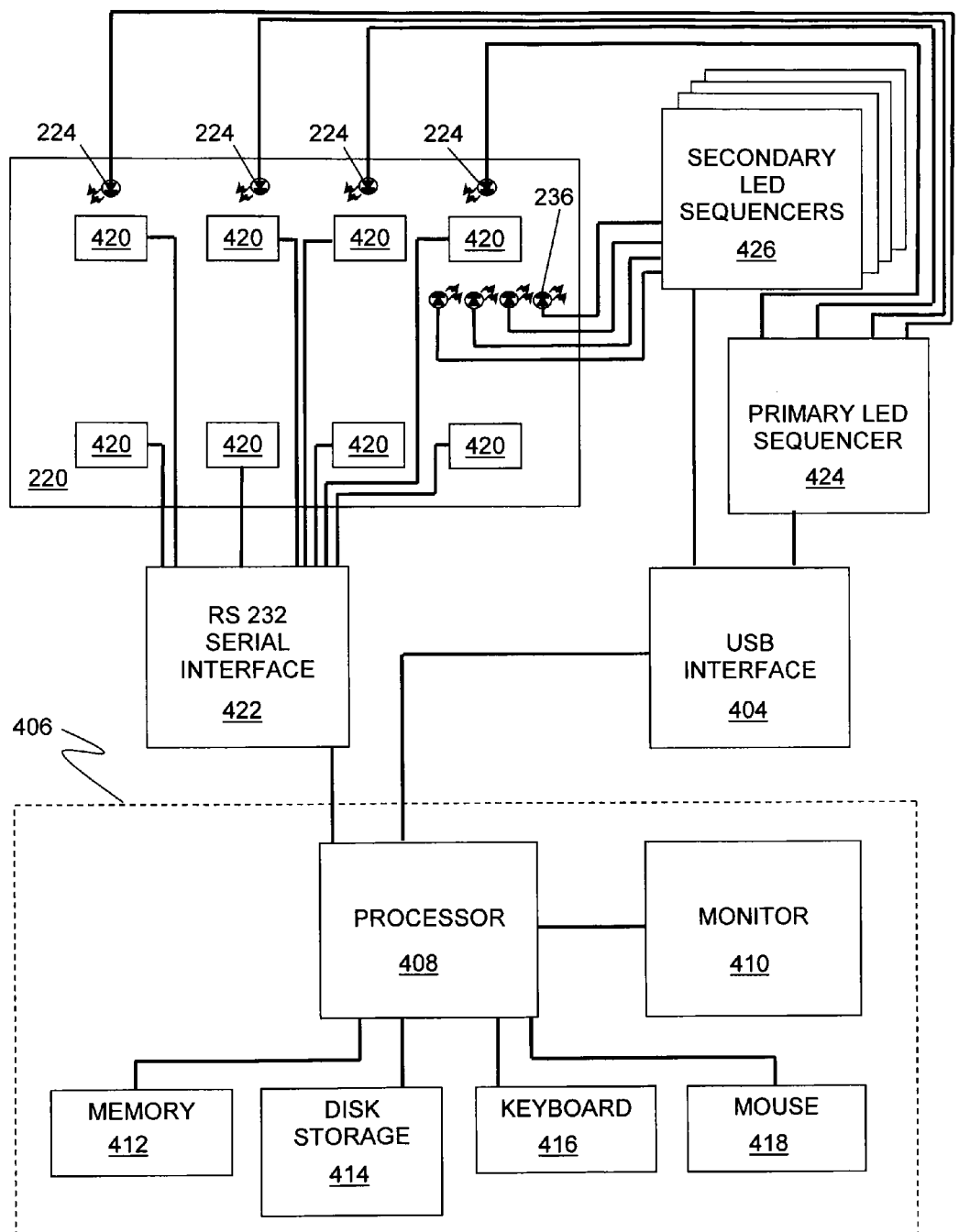
FIG. 16 is a simplified schematic diagram of a system including the workspace of FIG. 15.

In another embodiment depicted in FIGS. 15 and 16, additional indicator lamps may be added to provide additional counting assistance based on the value of members placed in each beat box 222. In this embodiment, four additional indicator LEDs 236 may be located in each beat box 222 as depicted. RFID passive card readers 420 may be located on the back of workspace 220 behind each beat box 222. RFID card readers 420 may be, for example, the Model 28140 RFID Card Reader available from Parallax, Inc. of Rocklin, Calif., or other similar device. Each card reader 420 is communicatively coupled through RS-232 serial interface 422 to processor 408 of personal computer 406. Passive RFID tags (not depicted), programmed with the appropriate type of each of quarter-note members 208, eighth-note members 210, sixteenth note members 212, quarter-rest member 214, and reversible whole/half rest members 216, are affixed to each of such members respectively, so as to enable identification of the particular member to the personal computer 406 when the member is placed on the beat box 222. Primary LED sequencer module 424 may again be a circuit constructed around a well-known 4017B decade counter integrated circuit, the output pins of which are connected to indicator LEDs 224. The clock input of the 4017B decade counter of the primary sequencer module 424 is coupled to USB interface module 404 coupled to personal computer 406 as before. In addition, a secondary LED sequencer module 426, including a 4017B decade counter integrated circuit and appropriate logic circuitry is provided for each beat box 222, with the output pins of the decade counter connected to indicator LEDs 236. The clock input of the 4017B decade counter of each secondary sequencer module 424 is also coupled to USB interface module 404 coupled to personal computer 406. Clock pulses provided through USB interface 404 provide a signal causing the 4017B decade counter of primary sequencing module 424 to sequentially light and extinguish LEDs 224 in time with the clock pulses. In addition, clock pulses can also be generated and sent to secondary sequencer module 426 to sequentially light LEDs 236 in each beat box 222 when LED 224 for that beat box is lit, as will be further described below.

In use, when a quarter-note member 208, eighth-note member 210, sixteenth note member 212, quarter-rest member 214, or reversible whole/half rest members 216, is placed on workspace 220 in one of beat boxes 222, the RFID passive card reader 420 corresponding to the beat box 222 reads the passive RFID tag affixed to the member to identify its value. Then, as LEDs 224 are lit and extinguished in time with the metronome beat generated by personal computer 406 with metronome software as described above, the secondary LED sequencer module 426 corresponding with that beat box 222 is signaled to sequentially light the LEDs 236 in the beat box 222 as appropriate for the value of the member placed in the box. For example, if a sixteenth note member 212 is placed in the beat box 222, the four LEDs 236 in the beat box will light in even sequence from left to right to signal the student to clap or sing the four times as is appropriate. If an eighth-note member 210 is placed in the beat box 222, the first and third ones of the LEDs 236 will light in sequence (with double the amount of time between) to signal the student to clap or sing twice as appropriate. If the quarter-note member 208 is placed in beat box 222, only the first of LEDs 236 will light, and if the quarter-rest member is placed in beat box 222, none of LEDs 236 will light. For members having a value greater than a quarter note or rest, such as a half note, whole note, half rest, or whole rest are placed, then the sequencers will cause the LEDs 236 to respond as appropriate either maintaining the first LED 236 in the first beat box 222 lit throughout the duration appropriate for a note member, or LEDs extinguished for the duration of a rest member.

Figure 13:
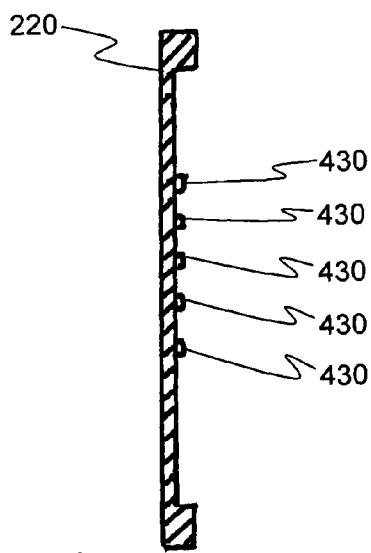
FIG. 13 is a cross-sectional view of the workspace of FIG. 12 taken at section 12-12.
Figure 12:
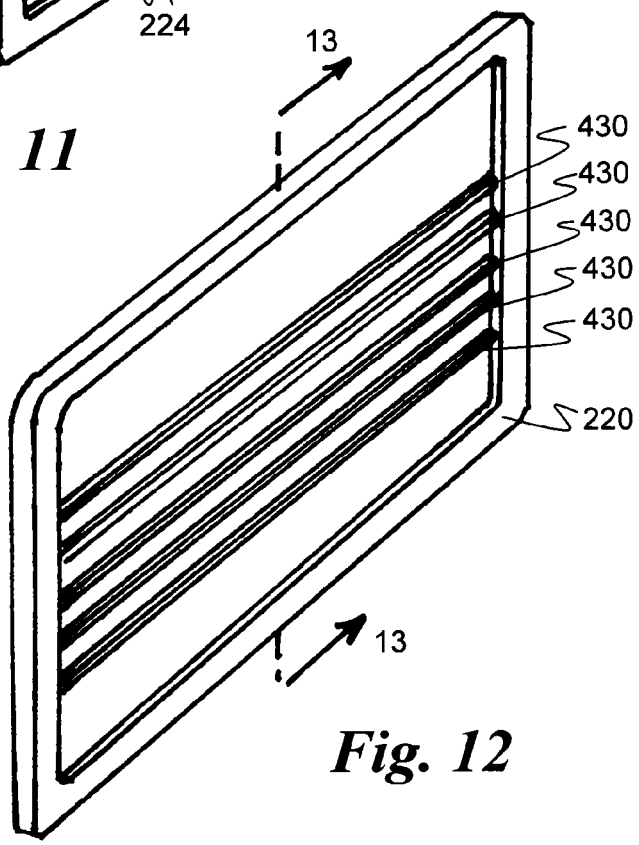
FIG. 12 is a perspective view of an alternative embodiment of the invention in which the workspace includes tactile staff indicia.

In yet another alternative embodiment depicted in FIGS. 12 and 13, workspace 220 may be provided with raised staff lines 430 to enable students with impaired vision to use workspace 220 by tactile feel. Raised staff lines 430 may be made with a height appropriate to still enable the note and other members to be affixed to workspace 220 without interference. As an alternative, staff lines 430 may also be grooves or recesses in workspace 220.

In the $1^{st}$ and $2^{nd}$ grades, young students can often understand the relationship of staff placement or rhythm symbolism but usually lack the dexterity to write music and it can be an almost impossible task for some, while very time-consuming for most, and with an often hard-to-read result. This makes music the physical act of music-writing impractical in the typical 30 minute classroom music session. The manipulative sets disclosed herein give children an easier, faster way to read, write, and abstract music.

As the students grow older, even into the middle school years, many of them will still prefer using the disclosed manipulatives over paper and pencil for learning. Additionally, the social aspect of working in groups and the motivation that comes from friendly competition makes cooperative learning games using the disclosed manipulative sets an ideal method for challenging and motivating older students.

As described above, once the class has learned simple rhythmic concepts and its' symbolism, such as reading patterns using various combinations of eighth and quarter notes, they can learn how to "write" the pattern using the disclosed manipulative sets. After the teacher models how to "write" patterns with the elements of the set, the students are taught the procedures for working as a team to solve "mystery rhythms" played for the class by the teacher.

Before working in teams, it is generally preferred to review procedures for working well on a team together. Students are usually experienced at cooperative learning and can be expected to assist in the process of establishing rules. An example of an extensive set of group learning expectations might be:

1. Stay with your group. (The exception is the "runner"—see "Group Roles").
2. Everyone helps to solve the problem.
3. Use quiet voices. (Voices that are not discernable to other groups).
4. Show respect for others and their ideas.
5. Work together and work things out.
7. Encourage your team mates.
8. Keep your answer hidden from other groups until the count of "three."
9. Listen for the quiet bell.

The first set of rules may be shorter and simpler than this list but each teacher and class will generally be able to determine the guidelines that work or need to be adjusted to keep things running smoothly during the game. After procedures/rules are decided upon, they may need to be discussed, clarified, modeled and practiced.

Once group learning procedures are established, the next step is to talk about roles/jobs within each problem-solving group. Some suggested roles for a beginning group are:

Runner: The group must stay in their own area. The exception to this is the runner who is allowed, when signaled by the teacher, to pick up the magnet sets and white board, and also to return them when finished. There is only one designated runner on each team.

Beat Checker: It is preferred to have one member of the group designated to count up the total beats on their answer to make sure the answer adds up to the correct beat total.

Board Holders: When it is time to show answers, the board can be cooperatively lifted by all of the students in the group or by 2 at a time at a young age. Teams can decide together how this responsibility will be handled.

Set Element Checker: This team member needs to count the members in the manipulative set to make sure that the set has the correct number of elements when the runner brings the set to the team at the start of the game. The checker also makes sure there is the same number of members returned to the container when the round is over. The runner should not return the manipulative set to the teacher's or judge's table until all the team members have helped to pick up the elements and the checker has verified that the entire set is in the container. The checker can also make sure the dry erase marker cap is on and that the marker is returned with the kit.

Figure 10:
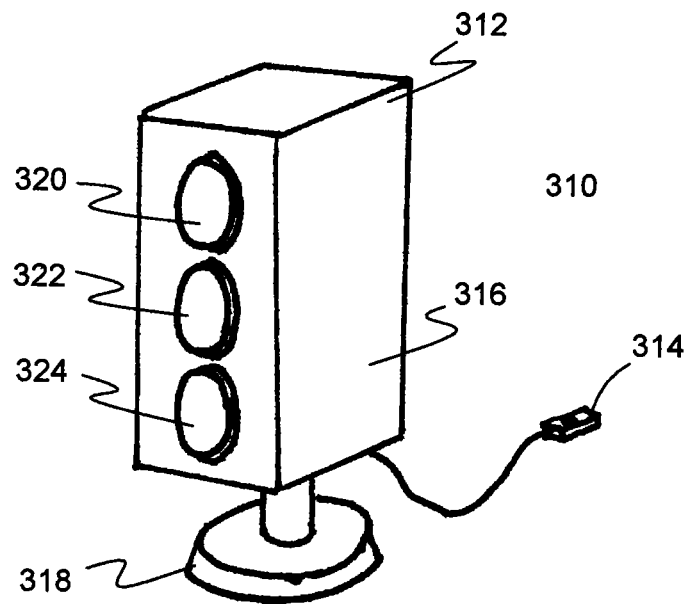
FIG. 10 is a perspective view of a stop light apparatus that may be included in systems according to embodiments of the invention.

Again, group roles need to be discussed, clarified, modeled and practiced. The next step can be to introduce a "stop light" system of signaling to the students. For example, as depicted in FIG. 10, a stop light apparatus 310 generally includes stop light body 312 and controller 314. Stop light body 312 generally includes housing 316 coupled to stand 318. Housing 316 encloses red indicator lamp 320, yellow indicator lamp 322, and green indicator lamp 324, which can be selectively lit or extinguished using controller 314.

In an embodiment, the signals are used as follows:

Red Light: The teacher sounds a sound device (not depicted) such as a bell or buzzer and actuates red lamp 320 to signal that it is time to listen for a sound puzzle to be played or for other announcements. The teacher may also actuate red lamp 320 and use the sound device to signal when it is time for teams to show their answers. When the teacher says "one . . . two . . . three" each team shows their answer to the sound puzzle on the count of three simultaneously and the teacher turns an answer board around at the same time. Students can compare their answers to see how they did, correcting as needed, and the class discusses where they might have "gone wrong" and how to do better in the next round.

Green Light: The teacher sounds the sound device and actuates green lamp 324. While green lamp 324 is on, teams may use quiet voices to confer with each other. By using quiet voices, they keep their answers secret from everyone but their own team and keep the room quiet enough for everyone to hear the sound device and see when red lamp 320 is turned on to signal the end of the exercise.

Yellow Light: About 30 seconds before the teacher sounds the sound device and switches on red lamp 320, the teacher may actuate yellow lamp 322 to help teams transition; to get ready to be quiet, and to show their answers on the count of three.

Before actually breaking up the class into groups to play the game, a group can be selected to demonstrate the entire process for the class. At each step, the class can discuss the actions of modeling group and constructively critique their adherence to procedures and processes. When all procedures seem to be successfully understood, the class can be divided into teams of 3-5 students, teams named, runners selected, and areas of the classroom assigned.

As described elsewhere herein, primary set 24 generally includes eighth note members, quarter note members, quarter rest members, half note members, half rest members, whole note members, and whole rest members. There may be no staff on the board, but teams may divide their board with the dry erase marker in the set to show 8 beat boxes. For problems that have 4 beat answers, teams put their answer into the top row of 4 beat boxes. Later, for 8 beat answers, teams put their answers into both rows.

The teacher may start out with a 4-beat rhythm pattern using ti-ti to syllables. If the students have learned to read rhythms using "counts" in the classroom, the teacher can then count out the rhythm using the numbers, and students and write the counts under their answers. Lastly, the teacher gives the rhythm pattern to the class by clapping or playing the rhythm without syllables or numbers and students abstract the sounds into notation using the various members of the set. If students learn to notate 4-beat rhythms by the pure sound of the relative rhythm lengths or speeds, the class can move on to 8 beat rhythmic notation. Each class period that students add a new rhythm symbol to their repertoire such as the quarter rest and then the half note, then the half rest, etc., the students can then play the game in teams to practice notating the new symbols as they acquire them.

During the primary education years, the teacher can use points to reward the class for following procedures but it is recommended that the points be given to the entire class since competition is usually too stressful and counterproductive for young children. One technique for adding excitement to the game without adding the direct pressure of competition is to play a game within the game called "mystery group." For example, the teacher can pick a mystery group to win a point for the class, one group for each of three selected group process goals and then announce what those goals are before the problem is given. The teacher may then make an announcement such as:

"Second Grade, I have selected one mystery group for each of these process goals; one group for quiet voices, another group for showing encouragement, and a third group for listening for the red light sound. I will only reveal the number (name) of the mystery group if the group wins the point for the class. If the group does not win the point by demonstrating the assigned skill, the name of the group will remain a mystery and I'll pick new assignments for the next round."

After the teacher counts, "one, two, three" and the answers are shown, the teacher gives the results of the mystery teams' successes, unless the team misses the point. Then it can be explained what needs to be improved and the game moves on without blame. As time allows, groups can do self-evaluation at the end of the class time to process their performance as a team.

The same or similar game processes and procedures can be used for teaching melodic reading, writing, and dictation using the primary pitch and notation set 41. The same game is played but the teacher sings pitches to the teams and the teams work together to notate the pitches.

The progression used may be the same as the Kodaly method. The students are told which line represents "so", often starting with a staff using only 2 lines for simplification. To begin with, each "problem" starts with "so" and only "so" or "mi" pitches are sung. As the students develop ease with notation, the pitch syllables are removed by sing pitches on a generic syllable such as "bum" and the students abtract the correct pitches by the relative highness or lowness of the pitch.

Next the students move on to a series 4 pitches in a row with the first pitch beginning on "so" and using all of the 4 pitch combinations made by only so and mi. When students can correctly abstract 4 pitches in a row and notate them accurately on their board, the class can move on to 8 pitches in a row. As new pitches are introduced in songs in the classroom, ("la", then "do", then "re", etc.), the game is a place where these new skills can be practiced and thoroughly assimilated.

When the class is ready for the more complex task of writing or dictating music using the combined concepts of pitch and rhythm, that can be accomplished with either set 24, 41. It is generally easiest using the rhythm set 24. When the rhythm set 24 is being used, the students can notate a melody by notating the rhythm first, and then pitches can be shown by writing the first letter of the pitch syllable, "s" for "so", "m" for "mi", etc. with a dry erase marker.

When set 41 is being used, students can first notate the melody by placing the note heads on the lines and spaces to notate the melody and then they can draw stems for quarters and stems with a beam for eighth note pairs. Or sets 24, 41, can be combined for notating both rhythm and pitch simultaneously.

Sets 24, 41, also work well for group or individual composition projects. For example, a four beat or eight beat rhythmic ostinato can be composed by a team using rhythm set 24. The group can then decide together what unpitched instruments would sound good with their ostinato and then practice and perform their composition with the class.

The students can also use the workspaces 22, 40, to create short melodies or motifs individually or as a group. For example, when the students have learned how to notate and abstract the pitches so, mi, and do, they can write an ostinato for a song the uses the tonic chord on the strong beats, first creating rhythm and then adding pitches as they choose from so, mi and do. For this exercise, the students can pick a pitched instrument, such as a xylophone or metallophone and practice and perform their composition with the class. Various ostinati can then be combined in the classroom performance to create new textures and forms as part of a whole-class composition.

To preserve compositions, individual names or classroom group numbers can be written clearly on the workspace holding the composition, as depicted in FIG. 5, and the teacher or a student can take a photo of the composition so it is digitally preserved before the kits are put away. If the workspace fills up the frame of the photo, it is easily readable for the entire class on a Smart™ board or using a projector, and it is still quite readable on a full computer screen if the class is not too far away.

It's also a good idea to take another picture, from a longer distance, of the individual or group holding the board with their composition as well, since it makes the composer/composers easily identifiable, and builds self esteem. Printed photos make nice keepsakes in a portfolio and/or a fun, easy-to-construct classroom bulletin board outside the music classroom door. There students can quietly read each others' compositions while they wait in line for music class or when they pass by on their way to lunch.

The disclosed systems and methods can continue to proceed sequentially and naturally along with the usual classroom learning in music as the children grow with the program. Intermediate set 54 and advanced set 80 have smaller members and contain various sixteenth note rhythm combinations and flagged eighth notes and dots for various dotted rhythms and for use with 6/8 and other time signature patterns.

The embodiments above are intended to be illustrative and not limiting. Additional embodiments are encompassed within the scope of the claims. Although the present invention has been described with reference to particular embodiments, those skilled in the art will recognize that changes may be made in form and detail without departing from the spirit and scope of the invention. For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A manipulative system for teaching musical notation, comprising:
   a planar workspace;
   a plurality of three-dimensional members each including a magnet for removably affixing the member to the workspace, the workspace adapted to magnetically receive the members at any position on the workspace, each of the three-dimensional members indicative of a musical notation symbol, the plurality of three-dimensional members including:
      a first shorthand rhythm notation member comprising an elongate, substantially straight body presenting a longitudinal axis, said first member being symmetrical about the longitudinal axis and being musically indicative of a quarter-note;
      a second shorthand rhythm notation member comprising a pair of spaced-apart, elongate, substantially straight portions, each of the spaced-apart portions presenting a longitudinal axis and a pair of opposing ends, each of the spaced-apart portions being symmetrical about its own longitudinal axis, the spaced-apart portions disposed parallel to each other and coupled together at one of the opposing ends of each portion with a third straight portion disposed at a right angle to the longitudinal axis of each of the spaced-apart portions, the second shorthand rhythm notation member being musically indicative of a pair of eighth-notes; and
   wherein the system further comprises a stop light apparatus.

2. The system of claim 1, wherein the plurality of three-dimensional members includes members musically indicative of a whole-note, a half-note, a quarter-note, an eighth-note, and a sixteenth-note.

3. The system of claim 1, wherein the plurality of three-dimensional members includes a generally oval shaped note-head member.

4. The system of claim 3, wherein the plurality of three-dimensional members includes at least one elongate stem member separate from the generally oval shaped note-head member, the stem member having one end conformingly shaped with the generally oval shaped note-head member so as to define a note symbol when the conformingly shaped end of the stem member is abutted with a perimeter of the generally oval shaped note-head member.

5. The system of claim 1, wherein the workspace is a magnetic white-board.

6. The system of claim 1, wherein the workspace includes musical staff indicia thereon.

7. The system of claim 1, wherein the planar workspace is free from indicia thereon.

8. The system of claim 1, further comprising a third shorthand rhythm notation member comprising four spaced-apart, elongate, substantially straight portions, each of the spaced-apart portions presenting a longitudinal axis and a pair of opposing ends, each of the spaced-apart portions being symmetrical about its own longitudinal axis, the spaced-apart portions disposed parallel to each other and coupled together at one of the opposing ends of each portion with a fifth straight portion disposed at a right angle to the longitudinal axis of each of the spaced-apart portions and a sixth straight portion disposed at a right angle to the longitudinal axis of each of the spaced-apart portions, the third shorthand rhythm notation member being musically indicative of four sixteenth-notes.

9. The system of claim 8, further comprising a plurality of first shorthand rhythm notation members, a plurality of second shorthand rhythm notional members, and a plurality of third shorthand rhythm notation members.

10. The system of claim 1, further comprising a container adapted to receive the plurality of three-dimensional members therein.

11. The system of claim 1, wherein the plurality of three-dimensional members includes a quarter-rest member.

12. The system of claim 1, wherein the plurality of three-dimensional members includes a half-rest member.

13. A manipulative system for teaching musical notation, comprising:
   a generally planar workspace having indicia marked thereon, wherein the indicia includes a plurality of beat boxes, the workspace further including a plurality of illuminable elements, at least one of the illuminable elements disposed in each beat box;
   apparatus for illuminating the illuminable elements in successive ones of the beat boxes in time with a beat of a musical composition; and
   a plurality of three-dimensional musical notation symbol members selectively attachable to the workspace to notate a musical composition.

14. A manipulative system for teaching musical notation, comprising:
   a pair of planar workspaces, a first one of the workspaces being free from indicia thereon, and a second one of the workspaces being marked with musical staff indicia;
   a plurality of three-dimensional members each including a magnet for removably affixing the member to the first workspace or the second workspace, each workspace adapted to magnetically receive the members at any position on the workspace, each of the three-dimensional members indicative of a musical notation symbol, the plurality of tbree-dimensional members including:
      a first shorthand rhythm notation member comprising an elongate, substantially straight body presenting a longitudinal axis, said first member being symmetrical about the longitudinal axis and being musically indicative of a quarter-note;
      a second shorthand rhythm notation member comprising a pair of spaced-apart, elongate, substantially straight portions, each of the spaced-apart portions presenting a longitudinal axis and a pair of opposing ends, each of the spaced-apart portions being symmetrical about its own longitudinal axis, the spaced-apart portions disposed parallel to each other and coupled together at one of the opposing ends of each portion with a third straight portion disposed at a right angle to ihe longitudinal axis of each of the spaced-apart portions, the second shorthand rhythm notation member being musically indicative of a pair of eighth-notes; and
      at least a first pitch notation member comprising a generally oval shaped note-head member; and
   wherein the system further comprises a stop light apparatus.

15. The system of claim 14, wherein the plurality of three-dimensional members includes at least one elongate stem member separate from the generally oval shaped note-head member, the stem member having one end conformingly shaped with the generally oval shaped note-head member so as to define a note symbol when the conformingly shaped end of the stem member is abutted with a perimeter of the generally oval shaped note-head member.

16. The system of claim 14, wherein each of the first workspace and the second workspace is a magnetic whiteboard.

17. The system of claim 14, further comprising a container adapted to receive the plurality of three-dimensional members therein.

18. The system of claim 14, wherein the plurality of three-dimensional members includes a quarter-rest member.

* * * * *